United States Patent [19]
Buniatyan

[11] Patent Number: 6,084,379
[45] Date of Patent: Jul. 4, 2000

[54] SOLAR POWERED RECHARGING DEVICE

[76] Inventor: Spartak Buniatyan, 6307 Klump Ave., North Hollywood, Calif. 91606

[21] Appl. No.: 09/109,696

[22] Filed: Jul. 2, 1998

[51] Int. Cl.[7] .............................. H02J 7/35; H01M 10/46
[52] U.S. Cl. ............................................ 320/101; 320/114
[58] Field of Search .................................... 320/101, 114; 136/245, 246

[56] References Cited

U.S. PATENT DOCUMENTS

| | | | |
|---|---|---|---|
| 5,701,067 | 12/1997 | Kaji et al. | 320/101 |
| 5,814,906 | 9/1998 | Spencer et al. | 136/245 |

*Primary Examiner*—Peter S. Wong
*Assistant Examiner*—Lawrence Luk

[57] ABSTRACT

A new solar powered recharging device for providing an additional charging capability for a personal communication device. The inventive device includes a solar panel that is secured to a surface of the personal communication device or a battery power source. The solar panel is in communication with the personal communication device or a battery power source that is electrically coupled to the personal communication device for continuously supplying power the personal communication device or the battery power source.

2 Claims, 3 Drawing Sheets

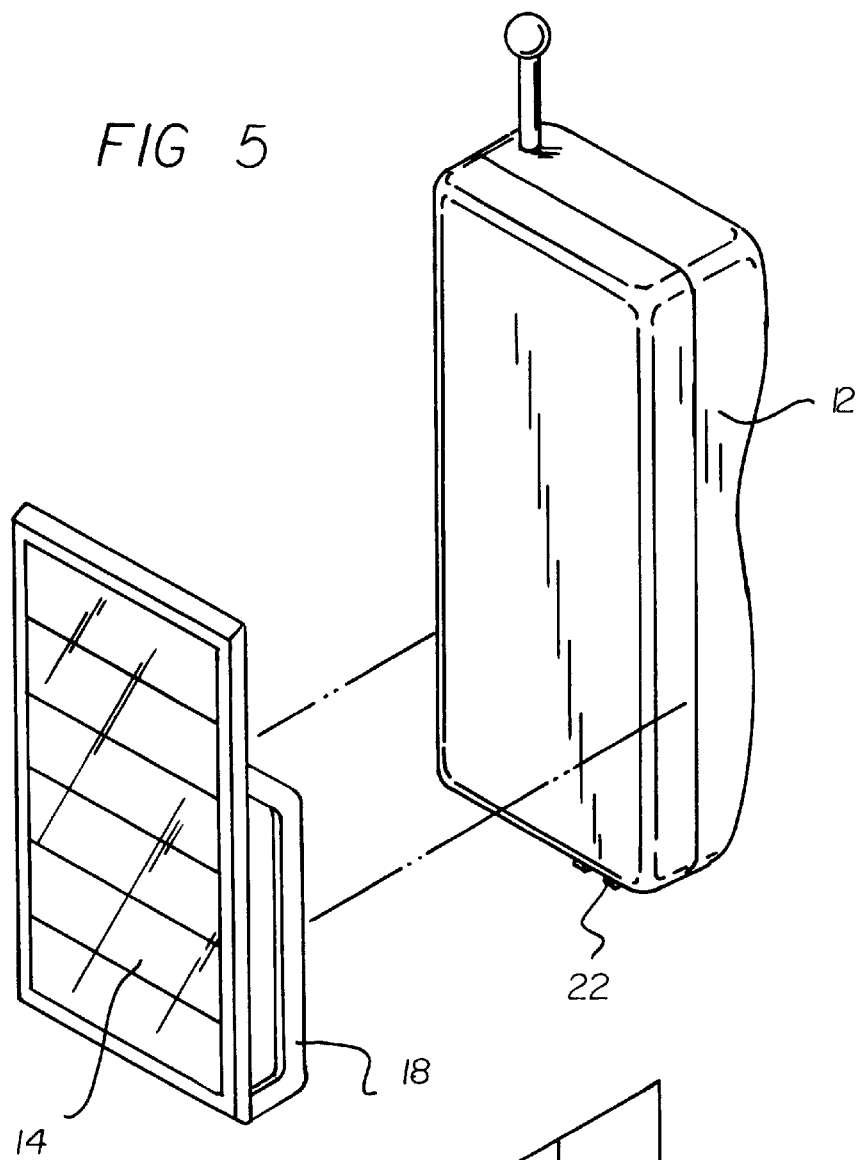
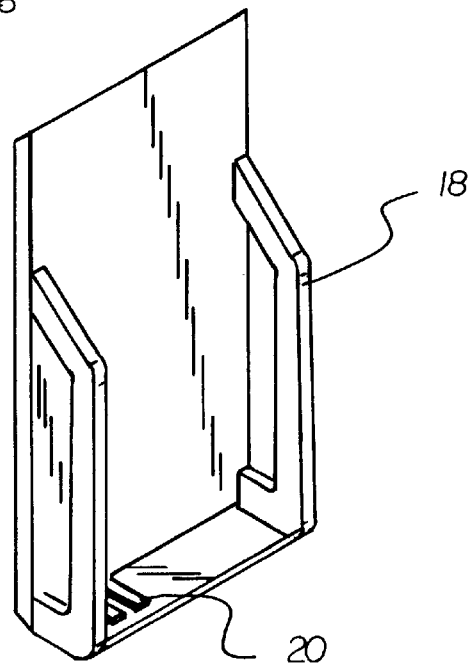

SOLAR POWERED RECHARGING DEVICE

BACKGROUND OF THE INVENTION

1. Field of the Invention

The present invention relates to battery chargers and more particularly pertains to a new solar powered recharging device for providing an additional charging capability for a personal communication device.

2. Description of the Prior Art

The use of battery chargers is known in the prior art. More specifically, battery chargers heretofore devised and utilized are known to consist basically of familiar, expected and obvious structural configurations, notwithstanding the myriad of designs encompassed by the crowded prior art which have been developed for the fulfillment of countless objectives and requirements.

Known prior art battery chargers include U.S. Pat. No. 4,441,143 to Richardson, Jr.; U.S. Pat. No. 4,786,851 to Fuji et al.; U.S. Pat. No. Des. 277,844 to Toews; U.S. Pat. No. 4,871,959 to Gali; U.S. Pat. No. 5,377,256 to Franklin et al.; and U.S. Pat. No. 4,905,270 to Ono.

While these devices fulfill their respective, particular objectives and requirements, the aforementioned patents do not disclose a new solar powered recharging device. The inventive device includes a solar panel that is secured to a rear surface of the personal communication device or a battery power source. The solar panel is in communication with the personal communication device or a battery power source that is electrically coupled to the personal communication device for continuously supplying power the personal communication device or the battery power source.

In these respects, the solar powered recharging device according to the present invention substantially departs from the conventional concepts and designs of the prior art, and in so doing provides an apparatus primarily developed for the purpose of providing an additional battery charging capability.

SUMMARY OF THE INVENTION

In view of the foregoing disadvantages inherent in the known types of battery chargers now present in the prior art, the present invention provides a new solar powered recharging device construction wherein the same can be utilized for providing an additional charging capability for a personal communication device.

The general purpose of the present invention, which will be described subsequently in greater detail, is to provide a new solar powered recharging device apparatus and method which has many of the advantages of the battery chargers mentioned heretofore and many novel features that result in a new solar powered recharging device which is not anticipated, rendered obvious, suggested, or even implied by any of the prior art battery chargers, either alone or in any combination thereof.

To attain this, the present invention generally comprises a solar panel that is secured to a rear surface of the personal communication device or a battery power source. The solar panel is in communication with the personal communication device or a battery power source that is electrically coupled to the personal communication device for continuously supplying power the personal communication device or the battery power source.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new solar powered recharging device apparatus and method which has many of the advantages of the battery chargers mentioned heretofore and many novel features that result in a new solar powered recharging device which is not anticipated, rendered obvious, suggested, or even implied by any of the prior art battery chargers, either alone or in any combination thereof.

It is another object of the present invention to provide a new solar powered recharging device which may be easily and efficiently manufactured and marketed.

It is a further object of the present invention to provide a new solar powered recharging device which is of a durable and reliable construction.

An even further object of the present invention is to provide a new solar powered recharging device which is susceptible of a low cost of manufacture with regard to both materials and labor, and which accordingly is then susceptible of low prices of sale to the consuming public, thereby making such solar powered recharging device economically available to the buying public.

Still yet another object of the present invention is to provide a new solar powered recharging device which provides in the apparatuses and methods of the prior art some of the advantages thereof, while simultaneously overcoming some of the disadvantages normally associated therewith.

Still another object of the present invention is to provide a new solar powered recharging device for providing an additional charging capability for a personal communication device.

Yet another object of the present invention is to provide a new solar powered recharging device clip on charger as an option. A solar panel is secured to a rear surface of the personal communication device. The solar panel is in communication with a battery power source for continuous recharging of the battery power source.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a front perspective view of an alternate embodiment of the present invention.

FIG. 6 is a rear perspective view of the alternate embodiment of the present invention.

DESCRIPTION OF THE PREFERRED EMBODIMENT

Figure 1:
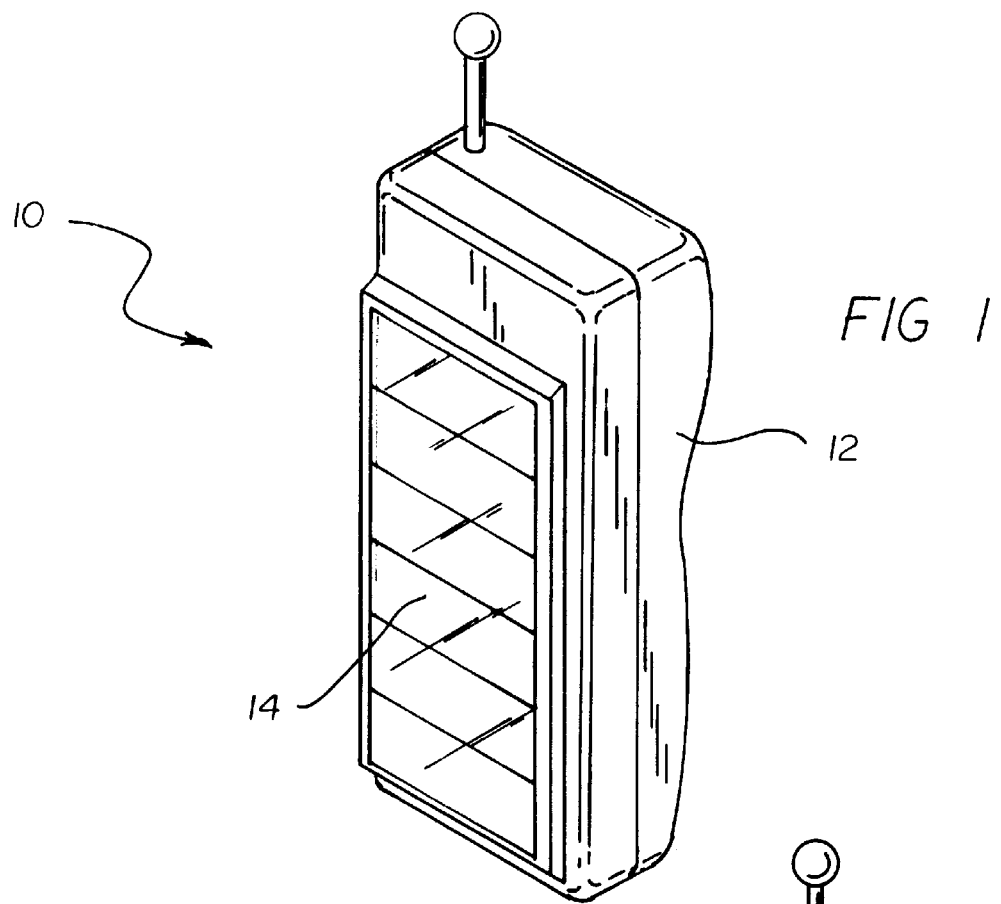
FIG. 1 is a perspective view of a new solar powered recharging device according to the present invention.
Figure 2:
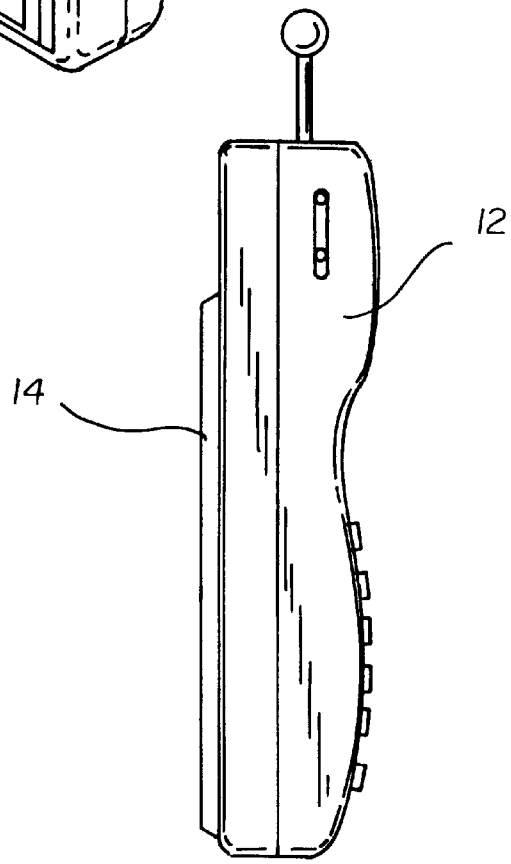
FIG. 2 is a side elevation view of the present invention.
Figure 3:
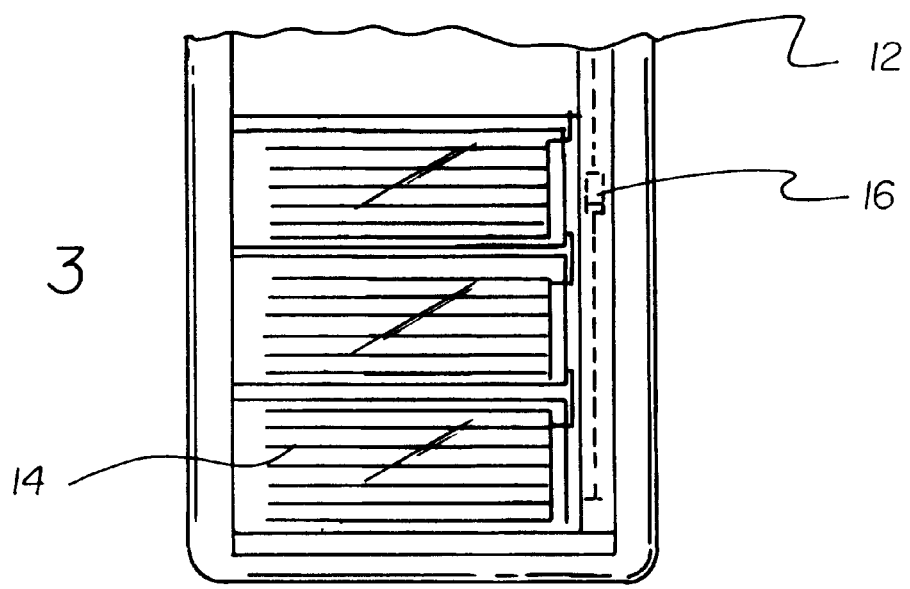
FIG. 3 is a rear view of the present invention illustrating the solar panel in communication with the personal communication device.
Figure 4:
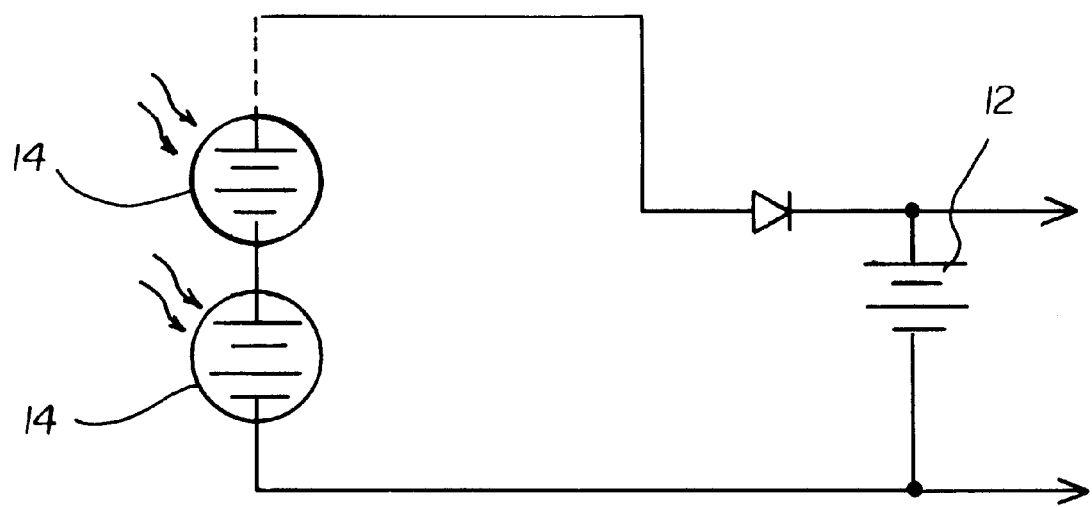
FIG. 4 is a schematic view of the present invention.

With reference now to the drawings, and in particular to FIGS. 1 through 6 thereof, a new solar powered recharging device embodying the principles and concepts of the present invention and generally designated by the reference numeral 10 will be described.

As best illustrated in FIGS. 1 through 6, the solar powered recharging device 10 comprises a solar panel 14 that is secured to a surface of a personal communication device 12 such as a cellular telephone. The solar panel 14 is in electrical communication with the personal communication device 12 to continuously supply power to the personal communication device 12. The solar panel 14 may also be secured to a surface of a battery power source 16 that provides power to the personal communication device 12.

Preferably, the solar powered recharging device 10 includes a pair of brackets 18 extending therefrom for removable coupling with a surface of the personal communication device 12 or a surface of the battery.

Also preferably, the solar powered recharging device 10 further comprises a battery power source 16 designed to physically interface with the selected model of a personal communication device 12. The battery power source 16 is in electrical communication with the solar panel 14.

Preferably, the solar panel 14 includes a pair of contacts 20 for communicating with the personal communication device 12 or the battery power source 16. The solar panel 14 is in electrical communication with the battery power source 16.

Ideally, the personal communication device 12 includes an extended rear panel to accommodate the addition of the solar panels 14, which could be protected with a transparent plastic and impact-resistant cover. This portion of the present invention would also feature a thin profile and have contoured dimensions to closely match the size and contour of the telephone. Incorporated into this combination solar panel 14 and battery pack would be the appropriate circuitry for proper voltage regulation, battery charging, and reverse polarity discharge protection.

The present invention would permit the user to extend the time frame for using the telephone before returning it to the base unit for recharging. The solar panel 14 will allow for ongoing recharging during use to allow the user to re-acquire the cordless or personal communication device operation immediately, without having to wait several hours for the battery power source to be recharged.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A solar powered phone system for providing an additional battery charging capability to a portable phone, the phone system comprising:

a portable telephone, the telephone having a battery power source and a pair of charging contacts on a lower face of a housing of the telephone for providing power to said battery power source;

a solar panel adapted for securement to a rear face of the housing of the telephone, the solar panel being in communication with the charging contacts of the telephone for providing continuous recharging of the battery power source;

the solar panel including a pair of brackets extending rearwardly from the solar panel, the brackets being for coupling with opposite side faces of the housing of the telephone whereby the solar panel is coupled to the rear face of the housing of the telephone; and wherein the solar panel includes a pair of contacts for communicating with charging contacts of the telephone.

2. A solar powered phone system for providing an additional battery charging capability to a portable phone, the phone system comprising:

a portable telephone, the telephone having a battery power source and a pair of charging contacts on a lower face of a housing of the telephone for providing power to said battery power source;

a solar panel adapted for securement to a rear face of the housing of the telephone, the solar panel being in communication with the charging contacts of the telephone for providing continuous recharging of the battery power source;

the solar panel including a pair of brackets extending rearwardly from the solar panel, the brackets being for coupling with opposite side faces of the housing of the telephone whereby the solar panel is coupled to the rear face of the housing of the telephone;

a rear panel extending outwardly from a lower edge of said solar panel and between said brackets, said rear panel being contoured to conform to the housing of the telephone, said rear panel including a pair of electrical contacts positioned for operationally coupling to said charging contacts of said telephone when said solar panel is engaged to said telephone.

* * * * *